United States Patent
Bianchi et al.

(10) Patent No.: US 7,051,643 B1
(45) Date of Patent: May 30, 2006

(54) RETAINER FOR MOUNTING A BRAKE BOOSTER

(75) Inventors: Michael Bianchi, Canton, MI (US); Marshal Zinn, Waterford, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/822,157

(22) Filed: Apr. 10, 2004

(51) Int. Cl.
B60T 13/52 (2006.01)

(52) U.S. Cl. .................. 92/169.3; 411/172; 248/230.7

(58) Field of Classification Search .................. 92/128, 92/169.3; 91/376 R; 248/230.7, 230.1; 403/329; 411/71, 352, 172, 173, 174, 175
See application file for complete search history.

(56) References Cited

U.S. PATENT DOCUMENTS

| | | | | |
|---|---|---|---|---|
| 2,244,976 A | * | 6/1941 | Tinnerman | 411/173 |
| 4,594,854 A | * | 6/1986 | Takeuchi et al. | 92/169.3 |
| 4,658,660 A | | 4/1987 | Parker | |
| 4,785,628 A | * | 11/1988 | Myers | 92/169.3 |
| 5,014,597 A | | 5/1991 | Rueffer et al. | |
| 5,447,030 A | * | 9/1995 | Wang et al. | 92/169.3 |
| 6,189,437 B1 | * | 2/2001 | Morlan | 92/169.3 |
| 6,905,178 B1 | * | 6/2005 | Morlan et al. | 92/128 |

FOREIGN PATENT DOCUMENTS

| | | |
|---|---|---|
| EP | 0 215 586 | 3/1987 |
| EP | 0 237 148 | 9/1987 |
| WO | 02/055353 | 7/2002 |

* cited by examiner

Primary Examiner—Thomas E. Lazo
(74) Attorney, Agent, or Firm—MacMillan, Sobanski & Todd, LLC

(57) ABSTRACT

A brake booster assembly is temporarily mounted on a vehicle dash panel by use of a clip. The brake booster assembly includes a housing and at least one mounting bolt extending outwardly from an outer wall of the housing. The mounting bolt extends through an aperture of the vehicle panel to mount the brake booster to the vehicle panel. The clip is fastened to the mounting bolt. The clip has a securing structure for engaging with a wall of the vehicle panel to at least temporarily mount the brake booster to the vehicle panel.

19 Claims, 3 Drawing Sheets

RETAINER FOR MOUNTING A BRAKE BOOSTER

BACKGROUND OF THE INVENTION

This invention relates in general to vehicle braking systems, and in particular to a method of mounting a vacuum brake booster and master cylinder assembly onto a vehicle panel.

Most passenger vehicles include brake booster assemblies having a master cylinder and an accompanying brake booster. The master cylinder includes a housing having a bore formed therein. One or more pistons are slidably disposed in the bore. The pistons and the walls of the bore define pressure chambers having outlet ports connected to brake conduits. The other end of the brake conduits are connected to wheel brakes at the wheels of the vehicle. The master cylinder further includes an input rod. One end of the input rod is connected to one of the pistons, and the other end of the input rod is operatively connected to a brake pedal mounted in the interior of the vehicle. To apply a braking force to the wheel brakes, the driver of the vehicle depresses the brake pedal which causes movement of the input rod and the pistons to pressurize the chambers within the bore of the master cylinder. The fluid pressure within the chambers is transmitted to the wheel brakes via the conduits, thereby applying a braking force to the wheel brakes.

Brake systems also commonly include brake boosters operatively connected to the master cylinder to provide an assisting force in addition to the input force provided by the driver. Vacuum brake boosters and hydraulic brake boosters are two common types of boosters for passenger vehicles. Hydraulic brake boosters generally provide the assisting force by generating pressurized fluid to either impart a force on the input piston or introduce the pressurized fluid into the pressure chambers of the master cylinder or the fluid conduits connected to the wheel brakes.

Vacuum or pneumatic brake boosters provide an assisting force with the aid of the vacuum source of an engine manifold. Commonly, vacuum brake boosters include a hollow shell housing generally formed from stamped metal. A movable wall is disposed in the housing for movement in the forward and rearward directions with respect to the housing. The wall divides the interior of the housing into a front chamber to be connected to a vacuum source of the automobile, and a rear chamber which is selectively pneumatically connected to the front chamber and atmospheric pressure. A power piston is connected to the movable wall. An input member is disposed in the power piston and is movable in the forward and rearward direction with respect to the power piston by the operation of a brake pedal. A valve mechanism includes a vacuum pressure valve and selectively connects the rear chamber with the front chamber in response to the operation of the input member, and an atmospheric pressure valve selectively connects the rear chamber with atmospheric pressure in response to the operation of the input member. An output member is movable in the forward direction in response to the movement of the power piston with the movable wall for outputting the forward movement force of the power piston to the master cylinder.

Typically, brake booster assemblies include the vacuum booster which is attached to the master cylinder prior to installation in the vehicle. A fluid reservoir may also be attached to the master cylinder and selectively in fluid communication with the pressure chambers of the master cylinder. The brake booster, master cylinder, the input rod, and the reservoir generally are combined and attached to one another to form the brake booster assembly. The booster assembly is commonly installed into the vehicle as a single unit. The assembly is installed in the engine compartment and attached to the fire wall or dash panel separating the engine compartment from the passenger compartment. The assembly is attached such that the input rod extends through an opening formed through the panel. Commonly, the vacuum brake booster includes a plurality of mounting bolts extending outwardly from the shell. The mounting bolts extend through a plurality of corresponding apertures formed in the panel. After the input rod and mounting bolts are extended through their corresponding openings and apertures of the panel, the input rod is connected to a pedal assembly located on the opposing side of the panel from the brake booster assembly within the passenger compartment of the vehicle. Mounting fasteners or nuts are then threadably engaged with the mounting bolts of the brake booster assembly to secure the brake booster assembly to the panel. The pedal assembly may be connected to the input rod assembly prior to or subsequently to threadably fastening the threaded nuts to the mounting bolts. Since the brake booster assembly is located on the opposed side the of panel from the pedal assembly, this installation generally requires two workers or installers to prevent the brake booster assembly from tilting or falling out of its mounting location on the panel prior to installation. One installer holds the brake booster assembly in its mounting position, while the other installer holds the pedal assembly and mounts the threaded nuts to the mounting bolts of the booster. This type of installation is time consuming.

BRIEF SUMMARY OF THE INVENTION

This invention relates to the installation of a brake booster assembly for at least temporally mounting the brake booster assembly to a vehicle panel prior to more securely mounting the brake boost assembly to the panel. The installation utilizes one or more clips. The brake booster, such as a vacuum brake booster, includes a housing having at least one mounting bolt extending outwardly from an outer wall of the housing. The mounting bolt extends through an aperture of the vehicle panel on which the brake booster assembly is mounted. The clip is fastened to the mounting bolt, such as by resilient means. The clip includes a securing structure, such as a resilient tab, for engaging with a wall of the vehicle panel to at least temporarily mount said brake booster to the vehicle panel. The booster can be later more permanently, yet removably, mounted on the vehicle panel by threaded fasteners or nuts.

In a preferred embodiment of the clip, the clip includes a body having a generally tubular shape defining an axis. The body has a non-continuous cross-section defining a longitudinal slot in the clip. This slot permits the clip to be resiliently fastened to the bolt in a direction normal to the axis by extending the bolt through the slot. Preferably, the clip further includes a tapered end for engaging with external threads of the bolt to prevent the clip from moving in an axial direction relative to the bolt. The clip further preferably includes a tab extending radially outwardly from the main body of the clip. The tab having an which is engageable with the wall of the vehicle panel, thereby supporting the brake booster to the panel.

Various objects and advantages of this invention will become apparent to those skilled in the art from the following detailed description of the preferred embodiment, when read in light of the accompanying drawings.

DETAILED DESCRIPTION OF THE INVENTION

Figure 1:
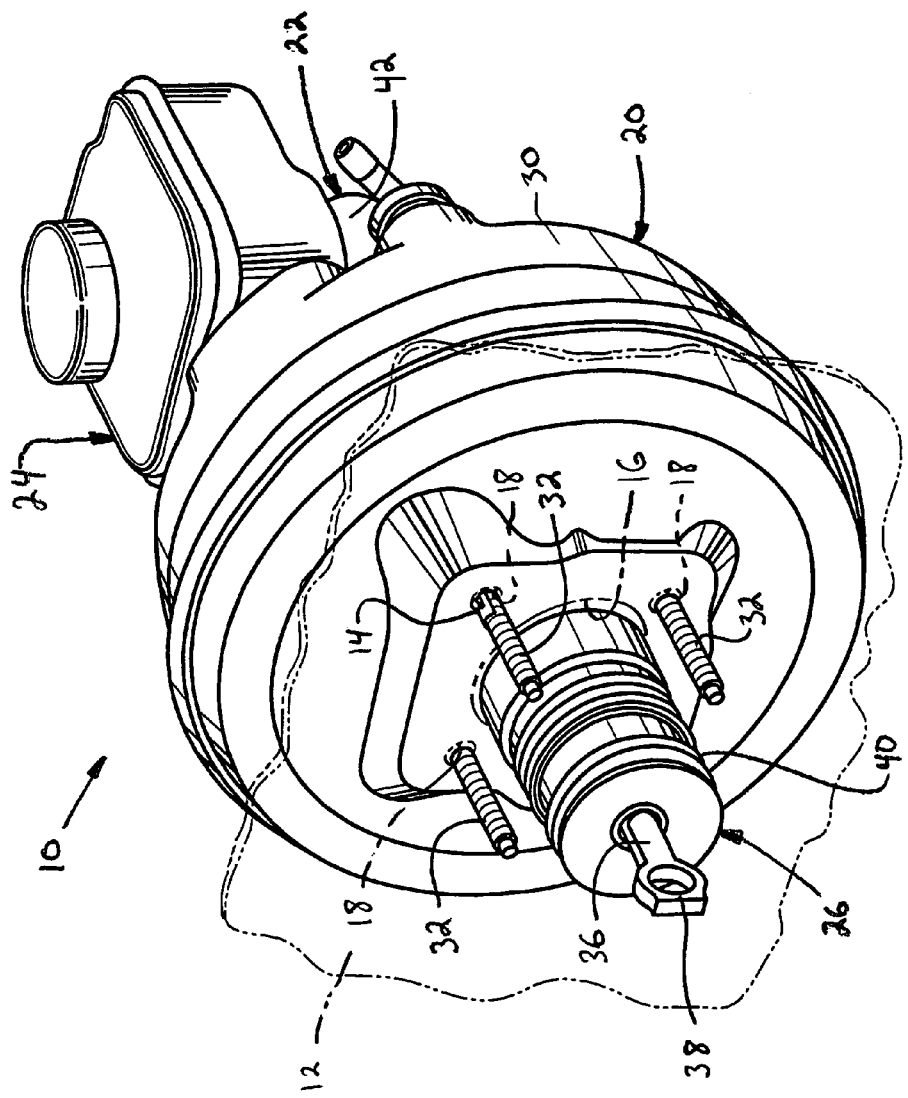
FIG. 1 is a perspective view of a brake booster assembly being supported on a vehicle panel by a clip in accordance with the present invention.

Referring now to the drawings, there is illustrated in FIG. 1 a brake booster assembly, indicated generally at 10. As will be discussed in detail below, the brake booster assembly 10 is at least temporarily mounted on a panel, indicated by phantom lines 12, by means of one or more clips 14. The panel 12 is shown represented by phantom lines 12 for clarity purposes since the brake booster assembly 10 is positioned behind the panel 12, as viewing FIG. 1. Although the panel 12 may be any panel of the vehicle on which the brake booster assembly 12 is to be installed, the panel 12 will most commonly be the fire wall or dash panel which separates the engine compartment from the passenger compartment of a vehicle. The panel 12 includes an opening 16 and a plurality of apertures 18, the reason for which will be explained below.

The brake booster assembly 10 generally includes a vacuum booster 20, a master cylinder 22 positioned behind the vacuum booster 20 as viewing FIG. 1, a fluid reservoir 24, and an input rod assembly 26. The vacuum booster 20, master cylinder 22, fluid reservoir 24, and input rod assembly 26 are preferably combined and attached to one another to form a single brake booster assembly 10. Thus, the brake booster assembly 10 is preferably installed into the vehicle as a single unit.

The vacuum booster 20 includes a hollow shell housing 30 which can be formed by any suitable manner, such as by stamped metal. A movable wall (not shown) is disposed in the housing for movement in the forward and rearward directions with respect to the housing 30. The wall divides the interior of the housing into a front chamber to be connected to a vacuum source of the automobile, and a rear chamber which is selectively pneumatically connected to the front chamber and atmospheric pressure. A power piston (not shown) is connected to the movable wall. An input member (not shown) is disposed in the power piston and is movable in the forward and rearward direction with respect to the power piston by the operation of a brake pedal. A valve mechanism (not shown) includes a vacuum pressure valve to selectively connect the rear chamber with the front chamber in response to the operation of the input rod assembly 26, and an atmospheric pressure valve (not shown) selectively connects the rear chamber with atmospheric pressure in response to the operation of the input member. An output member (not shown) is movable in the forward direction in response to the movement of the power piston with the movable wall for outputting the forward movement force of the power piston to the master cylinder 22. The booster 20 includes one or more mounting bolts 32 extending outwardly from the housing 30. In the embodiment of the booster 20 illustrated in FIG. 1, there are four mounting bolts 32. However, it should be understood that the booster 20 may be provided with any number of mounting bolts 32. Preferably, the mounting bolts 32 are fixed relative to the housing 30, and therefore do not rotate or move axially relative thereto. Preferably, each of the mounting bolts 32 includes external threads formed thereabout. When the brake booster 10 is installed onto the panel 12, the mounting bolts 32 extending through corresponding apertures 18 of the panel 12.

Figure 4:
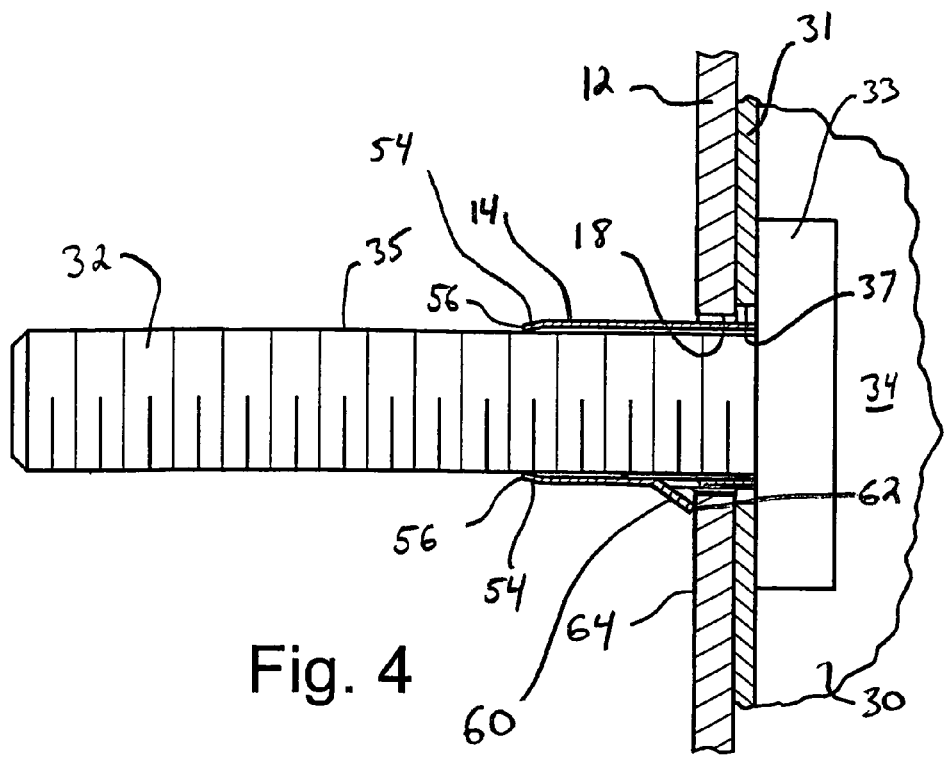
FIG. 4 is a partial cross-sectional view illustrating the brake booster assembly being temporarily mounted on the vehicle panel by the clip.
Figure 5:
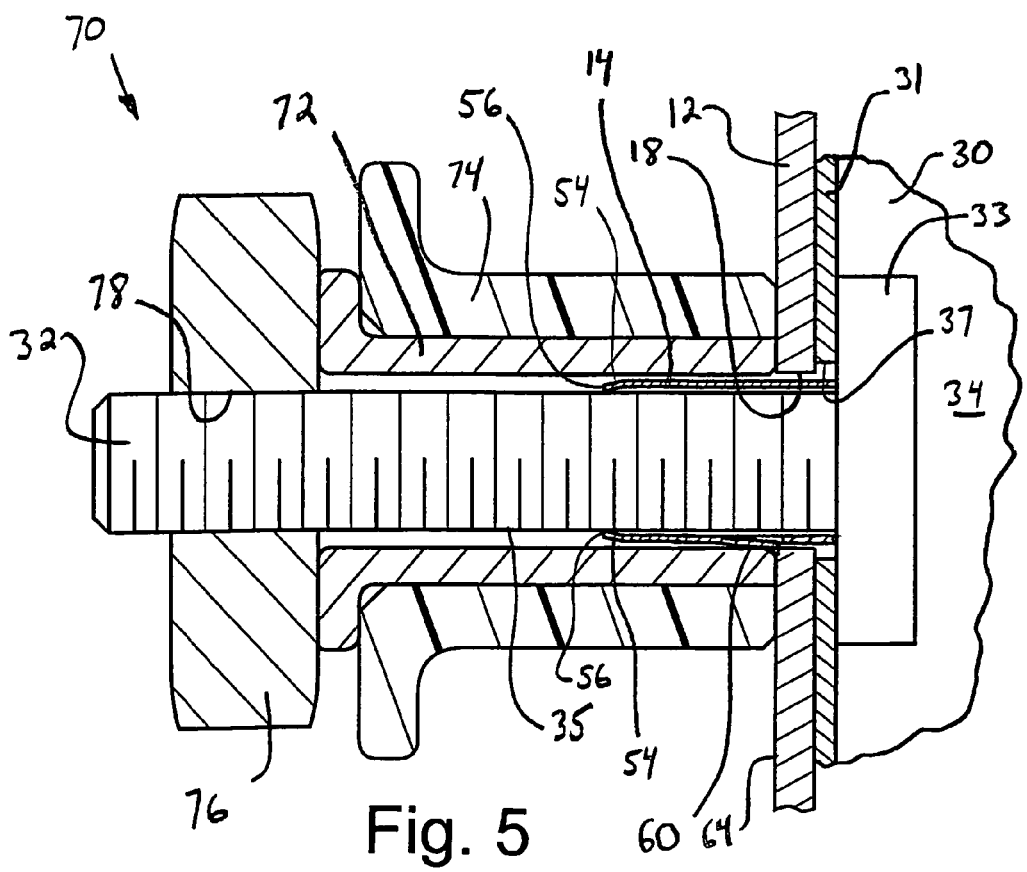
FIG. 5 is a partial cross-sectional view illustrating the brake boost assembly being more securely mounted on the vehicle panel by a nut bushing assembly.

As best shown in FIGS. 4 and 5, the mounting bolts 32 may include an enlarged head 33 formed on end thereof. The head 33 is attached to a wall 31 of the shell housing 30 of the booster 20. The head 33 of the mounting bolts 32 are disposed in the interior 34 of the housing 30 while a main stem portion 35 of the mounting bolts 32 having the external threads formed thereon extends through apertures 367 formed through the housing 30 of the booster 20. The stem portions 35 of the mounting bolts 32 extend outwardly from the wall 33 of the housing 30.

The input rod assembly 26 includes an input rod 36 which extends through the opening 16 of the panel 12 when the brake booster assembly 10 is installed onto the panel 12. During final installation, an end 38 the input rod 36 is connected to a brake pedal linkage assembly (not shown). The other end of the input rod is operatively connected to the moveable wall of the vacuum booster 20 and an input rod of the master cylinder 22. The input rod assembly 26 may also include an optional elastomeric boot 40 to help prevent contaminates from entering the booster 20 and the input rod assembly 26. The boot 40 may also seal the front end of the booster 20.

The master cylinder 22 is positioned behind the vacuum booster 20, as illustrated in FIG. 1. The master cylinder 22 preferably includes a housing 42 having a bore (not shown) formed therein. One or more pistons (not shown) are slidably disposed in the bore. The pistons and the walls of the bore define pressure chambers having outlet ports connected to brake conduits. The other end of the brake conduits are connected to wheel brakes at the wheels of the vehicle. The master cylinder further includes an input rod (not shown). One end of the input rod is connected to one of the pistons, and the other end of the input rod is operatively connected to the input rod assembly 26. To apply a braking force to the wheel brakes, the driver of the vehicle depresses the brake pedal which causes movement of the input rod 36 and the pistons of the master cylinder 22 to pressurize the chambers within the bore of the master cylinder 22. The fluid pressure within the chambers is transmitted to the wheel brakes via the conduits, thereby applying a braking force to the wheel brakes. The vacuum booster 20 provides an assisting force on the linkage between the input rod assembly 26 and the pistons of the master cylinder 22.

The fluid reservoir 24 is connected to an upper portion of the master cylinder 22. The fluid reservoir 24 stores a volume of brake fluid and is selectively in communication with the chambers of the master cylinder 22 defined by the pistons and the wall of the bore formed through the housing of the master cylinder 22.

Figure 3:
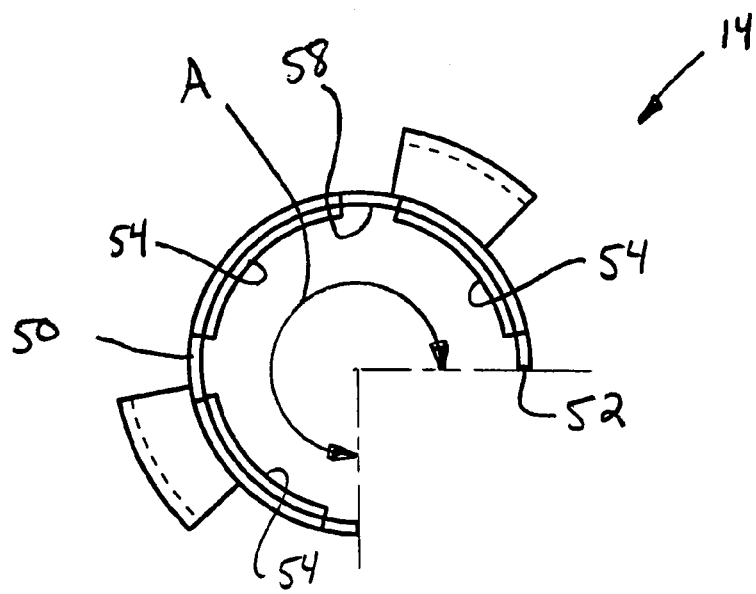
FIG. 3 is an end view of the clip of FIGS. 1 and 2.
Figure 2:
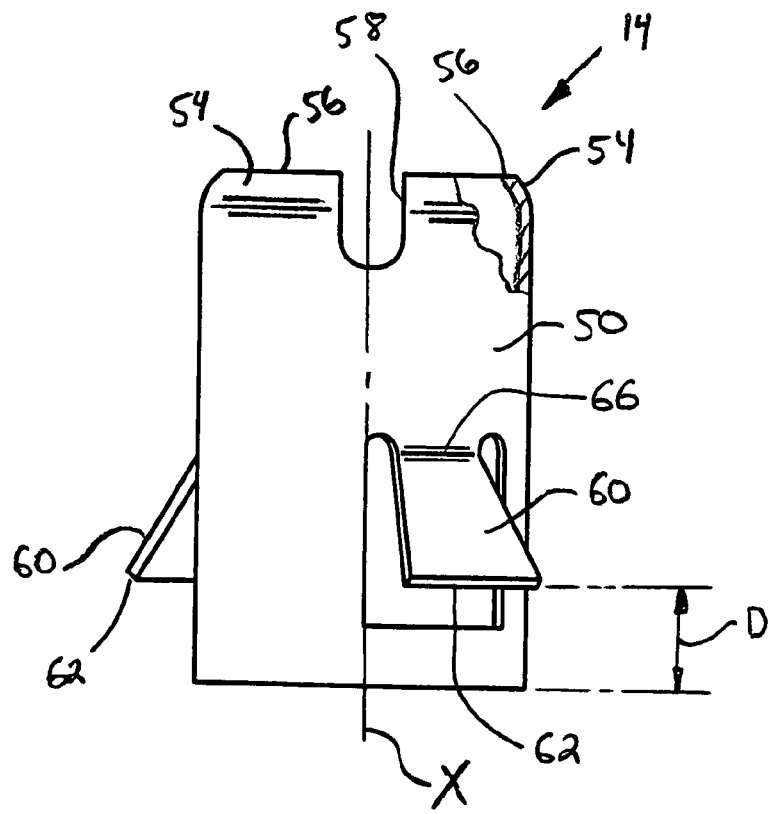
FIG. 2 is an elevational front view in partial cross-section of the clip of FIG. 1.

As stated above, the brake booster assembly 10 is at least temporarily mounted on the panel 12 by means of one or more of the clips 14. As best shown in FIGS. 2 and 3, the clip 14 has a generally tubular shape defining a main body 50. The tubular shaped body 50 defines an axis X. Preferably, the body 50 has a non-continuous cross-section such a longitudinal slot 52 is formed in the clip 14. Preferably, the clip 14 is formed from a blank relatively flat piece of material, such as metal, which is stamped into a generally tubular shape, as shown in FIGS. 2 and 3. Preferably, the body 50 of the 14 is curved into a circular tubular shape such that the curved wall of the body 50 extends though at least two quadrants or at an angle A greater than 180 degrees for resiliently fastening to the cylindrically shaped mounting bolts 32, as will be explained in detail below. As shown in the embodiment of the clip in FIGS. 2 and 3, the body 50 is formed covering approximately 270 degrees of a perimeter of a circular tube shaped body, and the slot 52 is formed at approximately 90 degrees.

The clip 14 also preferably includes one or more tapered end portions 54 which are bent radially inwardly. The purpose of the end portions 54 is to engage the external threads of the mounting bolts 32 to prevent the clip 14 from moving axially relative to the mounting bolts 32. The end portions 54 include an outermost end 56 which engages between adjacent external threads of the mounting bolts 32. Thus, the clip 14 is unlikely to slip axially along the external threads of the mounting bolts 32. The end portions 54 may be bent or formed at any suitable angle relative to the axis X to provide proper contact with the external threads of the mounting bolts. If desired, the clip 14 may include longitudinal relief cuts 58 formed therein adjacent the end portions 54 to permit the material of the end portions to be bent radially inwardly.

The clip 14 also preferably includes one or more securing structures or tabs 60 extending radially outwardly from the body 50. The tabs 60 include ends 62 which contact or engage with an outer surface 64 of the panel 12, as will be explained in detail below. The tabs 60 may be formed by first cutting a U-shaped slot in the body 50 and then bending the tab 60 radially outwardly from the body 50 at a bend 66. Preferably, the clip 14 is made of a material permitting the tab 60 to be bent resiliently at the corresponding bend 66 to function in a generally spring like manner such that the end 62 of the tab 60 is biased radially outwardly if forced radially inwardly, such as during installation of the brake booster assembly 10.

To temporarily mount the brake booster assembly 10 onto the panel 12, one or more clips 14 are first fastened to corresponding mounting bolts 32. As shown in FIG. 1, a single clip 14 may be used and attached to a single upper mounting bolt 32. The clip 14 is preferably resiliently fastened to the mounting bolts 32 by inserting the clip 14 in a direction normal to the axis of the clip 14 and the bolt 32 onto the mounting bolt 32 such that bolt 32 extends through the longitudinal slot 52 of the clip 14. The generally C-shaped cross-section of the clip 14 will expand to accommodate the diameter of the mounting bolt 32 and then preferably contract around the mounting bolt 32. If desired, the clip 14 could also be threadably inserted onto the mounting bolt 32 until the tabs 60 are at a desired position along the length of the mounting bolt 32. In this configuration, the longitudinal slot 52 may not be required, and the clip 14 could be made with a continuous cross-sectional shape. The tapered end 54 help prevent the clip 14 from moving in an axially direction along the length of the mounting bolt 32 by resiliently disposing the ends 56 of the tapered end portions 54 between adjacent external threads of the mounting bolts 32.

Once the clip 14 or plurality of clips 14 are attached to the mounting bolt(s), the brake booster assembly 10 is positioned adjacent the outer surface 64 of the panel 12 such that the input rod assembly 26 extends through the opening 16, and the mounting bolts 32 extend through their corresponding apertures 18. During insertion of the mounting bolts 32 through the apertures 18, the tabs 60 will be forced radially inwardly by the edges of the apertures 18 upon contact therewith. Sufficient insertion of the mounting bolts 32 through the apertures 18 will permit the tabs 60 to resiliently snap radially outwardly once the ends 62 of the tabs 60 moves sufficiently past the outer surface 64 of the panel 12. The tabs 60 then expand radially outwardly such that the ends 62 of the tabs 60 engage with the outer surface 64 of the panel 12, as shown in FIG. 4. At this position, the mounting bolts 32 of the brake booster assembly 10 are resisted from being pulled out of the apertures 18, thereby temporarily mounting the brake booster assembly 10 to the panel 12. Thus, the installer is now free from holding the brake booster assembly 10 onto the panel 12, and can now move from out of the engine compartment of the vehicle. The installer, or another installer, can now more securely mount the brake booster assembly 10 to the panel 12 from within the passenger compartment of the vehicle on the other side of the panel 12.

If a single clip 14 is used, it is preferred to mount the clip 14 onto an upper mounting bolt 32 since attachment to a lower mounting bolt might result in the brake booster assembly 10 rotating downwardly due to its own weight and pulling the upper mounting bolts 32 from out of the apertures 18 of the panel 12. Preferably, the clips 14 are sized such that the distance D from the end of the clip 14 to the end 62 of the tab 60 is approximately the thickness of the panel 12 and the wall 31 of the housing 30 of the booster or just slightly greater than. The clip 14 can then be mounted such that the end of the clip 14 is positioned adjacent the head 33 of the mounting bolt 32. This helps to assure that the brake booster assembly 10 is temporarily mounted flush with respect to the panel 12. Of course, it should be understood that the clip 14 can be sized to any suitable dimension to easily locate the position of the end 62 of the tabs 62 relative to the mounting bolt 32.

One embodiment for more securely mounting the brake booster assembly 10 to the panel is by means of a nut assembly 70, as shown in FIG. 5. In the embodiment of the nut assembly 70 shown in the FIG. 5, the nut assembly 70 includes an inner bushing 72, an outer bushing 74, and a nut 76. The inner bushing 72, outer bushing 74, and nut 76 may be attached to one another or separate from one another. The inner bushing 72 is preferably made of metal, and the outer bushing may be made of a cast plastic. The nut 76 includes an internal thread portion 78 corresponding to the pitch of the external threads of the mounting bolts 32.

To more securely mount the brake booster assembly 10 to the panel 12, the nut assembly 70 is threaded onto the mounting bolt 32 until the end of the bushings 72 and/or 74 engage with the outer wall 64 of the panel 12. It is noted that the tabs 60 of the clips 14 are free to bend radially inwardly once the nut assembly 70 more securely mounts the brake booster assembly 10 to the panel 12, as shown in FIG. 5. Thus, the clip 14 is no longer needed to secure the brake booster assembly 10 to the panel 12. However, the nut assembly 70 could be configured such that the ends 62 of the tabs 60 of the clips 14 maintain engagement with the outer surface 64 of the panel 12.

It is preferred that the inner bushing 72 of the nut assembly 70 has in internal diameter that is greater than the diameter of the body 50 of the clip 14 such that the nut assembly 70 is disposed completely over the clip 14 during final mounting, as shown in FIG. 5. It is also preferred that the body 50 of the clip 14 has a diameter less than the diameter of the aperture 18 of the panel 12. This helps assure a flushness of the brake booster assembly 10 relative to the panel 12 such that housing 30 of the brake booster 20 is in contact with the wall of the panel 12 and the clip 14 does not interfere with this engagement. This flushness provides a more secure mounting of the brake booster assembly 12 onto the panel 12 such that the brake booster assembly 12 is less likely to vibrate or move relative to the panel 12.

Although the mounting bolts 32 have been described above and shown in FIGS. 1–5 as having external threads, the mounting bolts could be configured without threads and instead having a shoulder or groove formed therein for contacting the end 62 of the tab 60 of the corresponding clip 14. The mounting bolts could then have other fastening structures instead of the nut assembly 70 for more securely fastening the brake booster assembly 10 to the panel 12. Alternatively, the brake booster assembly 10 could have other mounting bolts not engaged with the clip for more securely mounting the brake booster assembly 10 to the panel 12. Thus, the mounting bolt can by any suitable member for engaging with a clip having a securing structure for engaging with a wall of the panel 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A brake booster assembly comprising:
   a brake booster including a housing having a wall;
   a mounting bolt extending from said wall; and
   a clip engaged with said mounting bolt and fixed in position relative thereto, wherein said clip is adapted to extend through an aperture formed through a vehicle panel so as to retain said brake booster and said mounting bolt thereto.

2. The brake booster assembly defined in claim 1 wherein said brake booster includes a master cylinder mounted on said housing, a fluid reservoir mounted on said master cylinder, and an input rod assembly attached to said master cylinder and adapted to be attached to a brake pedal assembly.

3. The brake booster assembly defined in claim 1 wherein said mounting bolt is fixed in position relative to said wall.

4. The brake booster assembly defined in claim 1 wherein said clip is generally tubular in shape.

5. The brake booster assembly defined in claim 4 wherein said clip has a longitudinal slot formed therethrough.

6. The brake booster assembly defined in claim 1 wherein said clip has a tapered end portion that engages said mounting bolt.

7. The brake booster assembly defined in claim 1 wherein said clip has a tab that extends away from said mounting bolt.

8. The brake booster assembly defined in claim 1 further including a bushing disposed about said mounting bolt and a nut threaded onto said mounting bolt.

9. The brake booster assembly defined in claim 8 wherein said bushing includes an inner bushing that is disposed about said mounting bolt and said clip and an outer bushing that is disposed about said inner bushing.

10. A combined vehicle panel and brake booster assembly comprising:
    a vehicle panel having an aperture formed therethrough;
    a brake booster including a housing having a wall;
    a mounting bolt extending from said wall; and
    a clip engaged with said mounting bolt and fixed in position relative thereto, said mounting bolt and said clip extending through said aperture formed through said vehicle panel so as to retain said brake booster and said mounting bolt thereto.

11. The combined vehicle panel and brake booster assembly defined in claim 10 wherein said brake booster includes a master cylinder mounted on said housing, a fluid reservoir mounted on said master cylinder, and an input rod assembly attached to said master cylinder and adapted to be attached to a brake pedal assembly.

12. The combined vehicle panel and brake booster assembly defined in claim 10 wherein said mounting bolt is fixed in position relative to said wall.

13. The combined vehicle panel and brake booster assembly defined in claim 10 wherein said clip is adapted to extend through an aperture formed through a vehicle panel so as retain said brake booster and said mounting bolt thereto.

14. The combined vehicle panel and brake booster assembly defined in claim 10 wherein said clip is generally tubular in shape.

15. The combined vehicle panel and brake booster assembly defined in claim 14 wherein said clip has a longitudinal slot formed therethrough.

16. The combined vehicle panel and brake booster assembly defined in claim 10 wherein said clip has a tapered end portion that engages said mounting bolt.

17. The combined vehicle panel and brake booster assembly defined in claim 10 wherein said clip has a tab that extends away from said mounting bolt.

18. The combined vehicle panel and brake booster assembly defined in claim 10 further including a bushing disposed about said mounting bolt and a nut threaded onto said mounting bolt.

19. A method of mounting a brake booster assembly on a vehicle panel comprising the steps of:
   a. providing a vehicle panel having an aperture formed therethrough;
   b. providing a brake booster including a housing having a wall and a mounting bolt extending from the wall;
   c. engaging a clip with the mounting bolt; and
   d. extending the mounting bolt and the clip through the aperture formed through the vehicle panel so as retain the brake booster and the mounting bolt thereto.

* * * * *